(12) United States Patent
Lindberg et al.

(10) Patent No.: US 12,351,076 B2
(45) Date of Patent: Jul. 8, 2025

(54) DRIVELINE FOR A VEHICLE

(71) Applicant: Volvo Truck Corporation, Gothenburg (SE)

(72) Inventors: Johan Lindberg, Gothenburg (SE); Mats Rydström, Billdal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 228 days.

(21) Appl. No.: 18/074,672

(22) Filed: Dec. 5, 2022

(65) Prior Publication Data
US 2023/0182578 A1 Jun. 15, 2023

(30) Foreign Application Priority Data
Dec. 9, 2021 (EP) .................................. 21213478

(51) Int. Cl.
| | | |
|---|---|---|
| *B60L 7/22* | (2006.01) | |
| *B60K 1/00* | (2006.01) | |
| *B60L 58/25* | (2019.01) | |
| *H02P 5/74* | (2006.01) | |
| *H02P 21/36* | (2016.01) | |

(52) U.S. Cl.
CPC .............. *B60L 7/22* (2013.01); *B60L 58/25* (2019.02); *H02P 5/74* (2013.01); *H02P 21/36* (2016.02); *B60K 2001/003* (2013.01); *B60L 2200/36* (2013.01)

(58) Field of Classification Search
CPC ........ B60L 58/25; B60L 2200/36; B60L 7/14; B60L 7/16; B60L 15/025; B60L 58/15; B60L 7/10; B60L 7/20; B60L 7/18; B60L 15/20; B60L 15/2045; B60L 58/12; B60L 58/56; B60K 2001/003; B60K 2001/006; B60K 11/02; H02P 5/74; H02P 21/36; H02P 29/60; B60Y 2300/91; B60Y 2306/05
See application file for complete search history.

(56) References Cited

U.S. PATENT DOCUMENTS

| | | | |
|---|---|---|---|
| 6,121,740 A | * | 9/2000 | Gale ....................... B60L 53/20 318/362 |
| 10,392,018 B1 | * | 8/2019 | Rhodes ................... B60L 58/25 |
| 2015/0239474 A1 | * | 8/2015 | Nakamura ............ B60L 3/0061 180/170 |

(Continued)

OTHER PUBLICATIONS

Extended European Search Report for European Patent No. 21212478. 7, mailed May 25, 2022, 10 pages.

*Primary Examiner* — Bickey Dhakal
(74) *Attorney, Agent, or Firm* — Sage Patent Group

(57) ABSTRACT

The present disclosure relates to a driveline for a vehicle. The driveline includes a set of electric machines with variable regeneration efficiency level. The set of electric machines with variable regeneration efficiency level includes at least one electric machine with variable regeneration efficiency level. An electric machine with variable regeneration efficiency level is such that the relation between electric energy and thermal energy produced the electric machine during regeneration can be varied. The driveline includes a cooling system connected to each electric machine in the set of electric machines such that the cooling system can remove heat generated by each electric machine in the set of electric machines.

18 Claims, 5 Drawing Sheets

(56) References Cited

U.S. PATENT DOCUMENTS

| | | | |
|---|---|---|---|
| 2017/0282751 A1* | 10/2017 | Fukuchi | ............... B60L 50/61 |
| 2018/0141462 A1 | 5/2018 | Kim et al. | |
| 2020/0114753 A1 | 4/2020 | Biderman et al. | |
| 2021/0313868 A1 | 10/2021 | Hayashi | |
| 2022/0194231 A1* | 6/2022 | Kufner | ............... B60L 15/2009 |

* cited by examiner

DRIVELINE FOR A VEHICLE

CROSS REFERENCE TO RELATED APPLICATIONS

This application claims priority to European Patent Application No. 21213478.7, filed on Dec. 9, 2021, the disclosure and content of which is incorporated by reference herein in its entirety.

TECHNICAL FIELD

The invention relates to a driveline for a vehicle, as well as to related control units, methods, and computer-implemented methods.

The invention can be applied in heavy-duty vehicles, such as trucks, buses and construction equipment. Although the invention will be described with respect to a truck, the invention is not restricted to this particular vehicle, but may also be used in other vehicles such as buses and construction equipment vehicles.

BACKGROUND

Contemporary vehicles, including but not limited to heavy-duty vehicles, are often equipped with a driveline comprising an electric machine for propelling the vehicle. Purely by way of example, the driveline may be one of the following: a hybrid driveline with an internal combustion engine; a fuel cell driveline with a fuel cell system connected to a battery and/or one or more electric machines, and an electric driveline that for instance comprises a battery pack and one or more electric machines.

As compared to e.g., a driveline that only contains an internal combustion engine as a propulsion power source, a driveline comprising an electric machine is associated with the advantage that the electric machine may generate electric energy from kinetic energy in addition to being able to generate kinetic energy from electric energy. For instance, when a vehicle hosting the driveline is to be braked, at least a portion of the kinetic energy of the vehicle in motion may be converted into electric energy by the electric machine and the electric energy thus generated may be stored in an electric storage medium, such as a battery pack.

However, in situations in which it is not possible to store surplus regenerated electric energy, for instance in a situation in which a battery pack is fully charged, alternative means for dissipating the surplus energy are needed. Service brakes can be used to decelerate a vehicle and thus dissipate an amount of the kinetic energy, but these cannot sustain braking for longer periods of time, i.e., they have limited endurance braking capability. Brake resistors can also be arranged to dissipate surplus energy, but these drive cost, take up valuable space, and are anyhow normally associated with a limited energy dissipating capacity.

SUMMARY

As such, an object of the present invention is to provide improved electrical vehicle drivelines.

According to a first aspect of the invention, the object is achieved by a driveline according to claim 1.

As such, the first aspect of the present invention relates to a driveline for a vehicle. The driveline comprises a set of electric machines with variable regeneration efficiency level. The set of electric machines with variable regeneration efficiency level comprises at least one electric machine with variable regeneration efficiency level. An electric machine with variable regeneration efficiency level is such that the relation between electric energy and thermal energy produced by the electric machine during regeneration can be varied, for instance either electrically by controlling an inverter configured to drive the machine or mechanically by changing a geometry of the electric machine. The driveline further comprises a cooling system connected to each electric machine in the set of electric machines such that the cooling system can remove heat generated by each electric machine in the set of electric machines. This cooling system is notable in the sense that it may be configured with a cooling capacity sufficient to transport away enough heat from the variable regeneration efficiency level electric machine to enable endurance braking by the electric machine. The driveline further comprises a control system.

The control system is adapted to receive status information indicative of a current status of the driveline and for at least one, preferably each one, of the electric machines in the set of electric machines with variable regeneration efficiency level:
- receive braking torque information indicative of a requested braking torque to be produced by the electric machine;
- in response to the braking torque information and the status information, determine a target relation between the electric energy and the thermal energy produced by the electric machine;
- control the electric machine such that the requested braking torque and the determined target relation between electric energy and thermal energy are obtained, and
- control the cooling system in response to the determined target relation between electric energy and thermal energy for the electric machine.

The driveline of the first aspect of the present invention implies a versatile use of at least one of the electric machines in the set of electric machines with variable regeneration efficiency level, such as a versatile use during braking a vehicle using at least one of the electric machines. By virtue of the control of the electric machine and the cooling system as indicated hereinabove, the electric machine may for instance be used for producing a braking torque even in condition in which the electric machine can only feed a limited amount of electric energy to an energy storage system. This is since the electric machine in such a condition instead may be controlled so as to produce a relatively large amount of thermal energy which may be transported away from the machine by the cooling system. As such, there is no longer a need for an over-dimensioned brake resistor to dissipate the excess energy during endurance braking of a heavy-duty vehicle, which is an advantage since this brake resistor tends to drive cost and also takes up valuable space on the vehicle.

Also, other brake torque generating components, such as service brakes, need not necessarily be employed to the same extent as in prior art drivelines. This in turn implies a reduced wear of e.g., brake torque generating components of a driveline.

Optionally, the set of electric machines with variable regeneration efficiency level comprises at least two electric machines. However, the techniques discussed herein are of course also applicable also for single-machine systems, such as a system where a single machine is connected to a driven axle via a differential.

The driveline may normally comprise an energy storage system whereby each electric machine in the set of electric machines is connected to at least a portion of the energy storage system such that electric energy can be transferred between the electric machine and the at least a portion of the energy storage system. Preferably, the energy storage system is adapted to store and supply electric energy. The status information indicative of a current status of the driveline may comprise information indicative of a current state of charge of at least a portion of the energy storage system being connected to each electric machine in the set of electric machines.

As such, though purely by way of example, the control system may use information indicative of the current state of charge of at least a portion of the energy storage system when determining a target relation between the electric energy and the thermal energy produced by an electric machine. As a non-limiting example, should the current state of charge be low, the electric machine may be controlled as to produce a relatively large amount of electric energy and a relatively small amount of thermal energy. On the other hand, as another non-limiting example, should the current state of charge be high, the electric machine may be controlled as to produce a relatively small amount of electric energy and a relatively large amount of thermal energy.

The status information indicative of a current status of the driveline may also comprise information indicative of a current power capacity of the energy storage system, i.e., how much power that can be received and stored at any given point in time.

Optionally, each electric machine in the set of electric machines is connected to a common entity, preferably a common battery pack, of the energy storage system.

Optionally, the cooling system comprises a set of cooling conduits wherein at least one cooling conduit extends to each electric machine in the set of electric machines. The cooling system is adapted to control a flow and/or a temperature of coolant through the cooling conduits.

Optionally, the cooling system is adapted to control the distribution of the flow of coolant amongst the cooling conduits.

Optionally, at least one electric machine in the set of electric machines with variable regeneration efficiency level can be controlled such that the ratio between the electric energy produced and the thermal energy produced by the electric machine during regeneration is less than 0.1, preferably less than 0.05, more preferred less than 0.01. As such, at least one electric machine may be controlled so as to produce a small amount of electric energy. Such a capability may be useful when e.g., an energy storage system portion connected to the electric machine has a high state of charge.

Optionally, at least one electric machine in the set of electric machines with variable regeneration efficiency level is an AC electric machine connected to an inverter. The inverter is adapted to issue a current vector to the electric machine, whereby the relation between electric energy and thermal energy produced by the electric machine during regeneration can be controlled by controlling the current vector issued from the inverter. The control of the regeneration efficiency using the inverter implies that a variable regeneration efficiency may be obtained in a cost efficient manner.

Optionally, at least one electric machine in the set of electric machines with variable regeneration efficiency level is an AC electric machine comprising a rotor and a stator with an airgap therebetween, whereby the stator comprises a stator body and a stator element. The relation between electric energy and thermal energy produced by the electric machine during regeneration is dependent on the position of the stator element relative to the stator body. The possibility to vary the relation between electric energy and thermal energy produced by the electric machine by changing the position of the stator element relative to the stator body implies a versatile manner of controlling the regeneration efficiency level.

Here, it should be noted that the torque generated by an electric machine is a function of the cross product between the current vector of the electric machine and the magnetic flux in an air gap formed between stator and rotor. It is therefore possible to adjust generated torque by altering the magnetic flux in the air gap. This adjustment of magnetic flux can be achieved by mechanically modifying the geometry of the electric machine, whereby the power losses in the electric machine can be manipulated.

Optionally, the stator element is an elongate member that in turn comprises a first elongate portion and a second elongate portion, the first elongate portion being of a first material and the second elongate portion being of a second material that is different from the first material. The first and second elongate portions being attached to each other and extending in parallel to each other along a stator element axis.

Optionally, the first material has a first magnetic permeability and the second material has a second magnetic permeability. The first magnetic permeability is greater than the second magnetic permeability.

Optionally, the stator element comprises one or more cooling channels being in fluid communication with the cooling system. Preferably, the second elongate portion comprises one or more cooling channels being in fluid communication with the cooling system Optionally, the stator body comprises a stator body cavity for accommodating at least a portion of the stator element, wherein the stator element can be rotated around the stator element axis relative to the stator body when the stator element is at least partially accommodated in the stator body cavity, whereby the relation between electric energy and thermal energy produced by the electric machine during regeneration is dependent on the rotational position of the stator element relative to the stator body.

Optionally, the stator body has an outer circumference and an inner circumference, wherein the inner circumference faces the rotor. The stator body cavity is arranged in the outer circumference.

Optionally, the control system is adapted to determine cooling capability information of the cooling system, the cooling capability information being indicative of a current or expected amount of thermal energy that can be removed from the set of electric machines using the cooling system. The control system is adapted to control the set of electric machines in response to the cooling capability information.

Optionally, the driveline comprises one or more ground engaging members, preferably wheels. At least one ground engaging member is adapted to be connected to an electric machine of the set of electric machines such that rotational energy may be transferred between the ground engaging member and the electric machine.

Optionally, each one of at least two ground engaging members is adapted to be connected to different electric machines of the set of electric machines such that rotational energy may be transferred between the ground engaging member and the electric machine.

A second aspect of the present invention relates to a vehicle comprising a driveline according to any one of the preceding claims, preferably the vehicle is a heavy-duty vehicle.

A third aspect of the present invention relates to a computer-implemented method performed in a control unit arranged to control a driveline for a vehicle. The driveline comprises a set of electric machines with variable regeneration efficiency level. The set of electric machines with variable regeneration efficiency level comprises at least one electric machine with variable regeneration efficiency level. An electric machine with variable regeneration efficiency level is such that the relation between electric energy and thermal energy produced by the electric machine during regeneration can be varied. The driveline further comprises a cooling system connected to each electric machine in the set of electric machines such that the cooling system can remove heat generated by each electric machine in the set of electric machines.

The method comprises:
receiving status information indicative of a current status of the driveline and for at least one, preferably each one, of the electric machine in the set of electric machines with variable regeneration efficiency level;
receiving braking torque information indicative of a requested braking torque to be produced by the electric machine;
in response to the braking torque information and the status information, determining a target relation between the electric energy and the thermal energy produced by the electric machine;
controlling the electric machine such that the requested braking torque and the determined target relation between electric energy and thermal energy are obtained, and
controlling the cooling system in response to the determined target relation between electric energy and thermal energy for the electric machine.

A fourth aspect of the present invention relates to a computer program comprising program code means for performing the steps of the third aspect of the present invention when the program is run on a computer or on processing circuitry of a control unit. 8

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

With reference to the appended drawings, below follows a more detailed description of embodiments of the invention cited as examples.

The invention will be described below for a vehicle in the form of a truck 10 such as the truck illustrated in FIG. 1. The truck 10 should be seen as an example of a vehicle which could comprise a driveline according to the present invention.

However, the present invention may be implemented in a plurality of different types of vehicles. Purely by way of example, the present invention could be implemented in any type of heavy-duty vehicle, such as a truck, a tractor, a bus, a work machine such as a wheel loader or any other type of construction equipment. The invention can also be implemented in a self-powered dolly vehicle or in an electric trailer with one or more driven axles. The techniques disclosed herein provide an endurance braking capability, i.e., an ability to dissipate large amounts of kinetic energy during extended periods of time. As such, the techniques are most advantageously applied in heavy-duty vehicles arranged to carry large loads.

Figure 1:
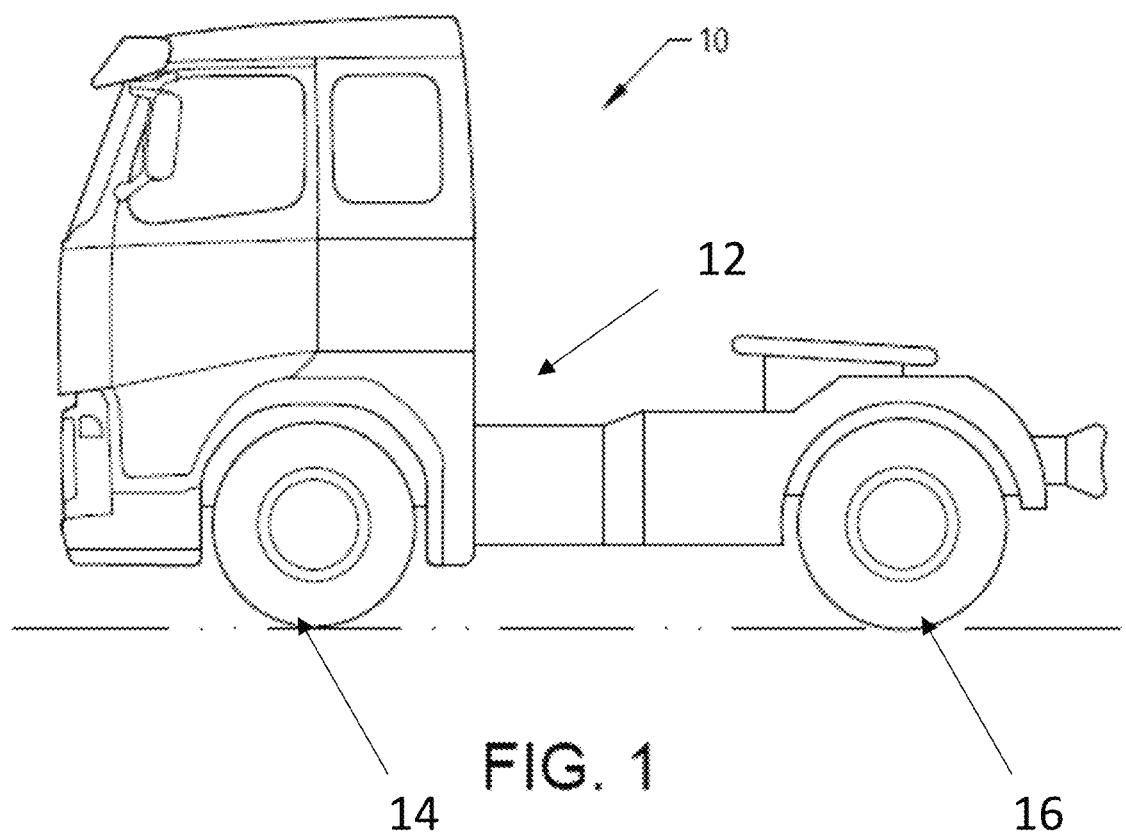
FIG. 1 illustrates an embodiment of a vehicle.

The FIG. 1 vehicle 10 comprises a driveline 12 for propelling the vehicle 10. The FIG. 1 driveline comprises a set of ground engaging members 14, 16. In FIG. 1, the ground engaging members are exemplified as wheels but in other embodiments of the driveline 12, the ground engaging members may be implemented as crawlers (not shown) or the like.

Figure 2:
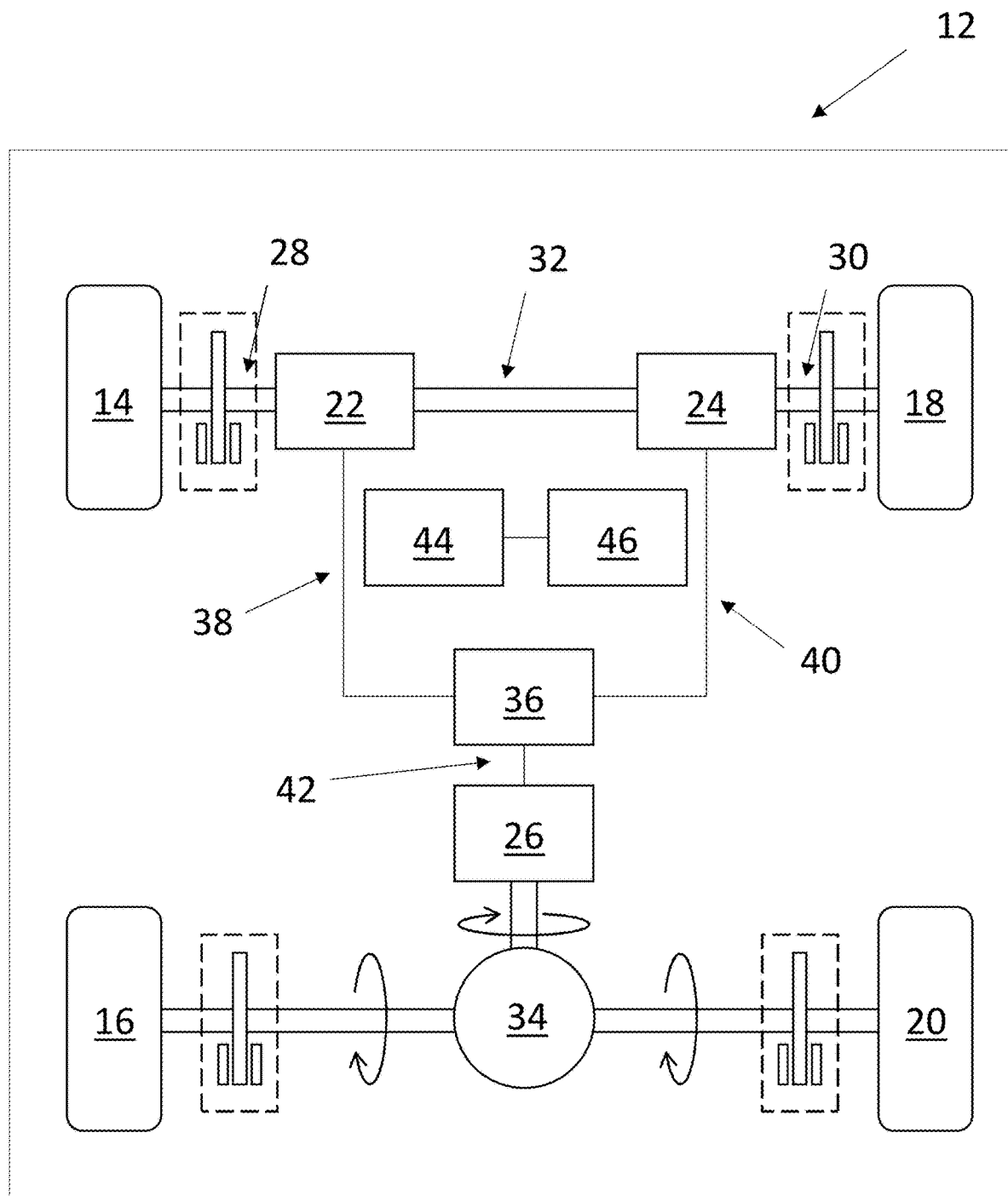
FIG. 2 schematically illustrates an embodiment of a driveline.

FIG. 2 illustrates an embodiment of a driveline 12 in accordance with a first aspect of the present invention. Purely by way of example, the driveline 12 may be used for a vehicle such as the FIG. 1 vehicle 10. Since FIG. 2 is a schematic top view of a driveline 12, four ground engaging members 14, 16, 18, 20, exemplified as wheels, are illustrated in FIG. 2.

The driveline 12 comprises a set of electric machines 22, 24, 26 with variable regeneration efficiency level. As used herein, the term "variable regeneration efficiency level" means that the electric machine is such that the relation between electric energy and thermal energy produced the electric machine during regeneration can be varied. The term "regeneration" is intended to mean that the kinetic energy, such as rotational energy, is supplied to the electric machine, for instance to the rotor of the electric machine, which kinetic energy is converted into electric energy and or thermal energy by the electric machine.

The driveline 12 may comprise one or more ground engaging members, preferably wheels, as indicated by reference numerals 14, 16, 18, 20 in FIG. 2. At least one ground engaging member is adapted to be connected to an electric machine of the set of electric machines 22, 24, 26 such that rotational energy may be transferred between the ground engaging member and the electric machine. Moreover, each one of at least two ground engaging members may be adapted to be connected to different electric machines of the set of electric machines such that rotational energy may be transferred between the ground engaging member and the electric machine.

The FIG. 2 embodiment of the driveline 12 comprises three electric machines 22, 24, 26 wherein a first electric machine 22 is mechanically connected to a first ground engaging member 14 via a first shaft portion 28 and a second electric machine 24 is mechanically connected to a second ground engaging member 18 via a second shaft portion 30. In the FIG. 2 embodiment, the first and second shaft portions 28, 30 are rigidly connected to each other via a connecting third shaft portion 32. However, it is also contemplated that the first and second shaft portions 28, 30 may be separate shafts not rigidly connected to each other. Thus, though purely by way of example, each one of the first electric machine 22 and the second electric machine 24 could be a hub motor.

Moreover, the FIG. 2 embodiment comprises a third electric machine 26 mechanically connected to each one of a third and fourth wheel 16, 20 via a transmission arrangement 34. As a non-limiting example, the transmission arrangement 34 may comprise a differential gear.

As indicated hereinabove, in the FIG. 2 embodiment, each one of the electric machines 22, 24, 26 may be associated with a variable regeneration efficiency level. However, it is contemplated that embodiments of the driveline may comprise a single electric machine being associated with a variable regeneration efficiency level. As a non-limiting example, such a single electric machine may constitute the single electric machine of the driveline, viz the single electric machine for propelling the vehicle such that the set of electric machines only contains the single electric machine. However, it is also contemplated that the driveline comprises a plurality of electric machines but that only one of the electric machines is associated with a variable regeneration efficiency level.

In a similar vein as for the above examples with a single electric machine, it is also contemplated that embodiments of the driveline may comprise a set of electric machines associated with a variable regeneration efficiency level as well as one or more additional electric machines not necessarily being associated with a variable regeneration efficiency level.

Moreover, as indicated in FIG. 2, the driveline 12 further comprises a cooling system 36 connected to each electric machine 22, 24, 26 in the set of electric machines such that the cooling system can remove heat generated by each electric machine 22, 24, 26 in the set of electric machines.

Purely by way of example, as indicated in FIG. 2, the cooling system 36 may comprise a set of cooling conduits 38, 40, 42 wherein at least one cooling conduit extends to each electric machine in the set of electric machines. In the FIG. 2 example, a first cooling conduit connects the first electric machine 22 to the cooling system 36, a second cooling conduit 40 connects the second electric machine 24 to the cooling system 36 and a third cooling conduit 42 connects the third electric machine 26 to the cooling system 36.

As a non-limiting example, the cooling system 36 may comprise a heat exchanger (not shown) adapted to remove heat from a coolant adapted to flow in the cooling conduits. The cooling system 36 may also comprise a heat-pump adapted to remove heat from a coolant adapted to flow in the cooling conduits. Generally, the cooling system 36 may be adapted to control a flow of coolant through the cooling conduits 38, 40, 42. As a non-limiting example, the cooling system 36 may be adapted to control the distribution of the flow of coolant amongst the cooling conduits 38, 40, 42.

As a non-limiting example, the cooling system 36 may have a cooling capacity in excess of about 300 kW, and preferably in excess of about 400 kW, or even more preferably in excess of about 500 kW.

The driveline further comprises a control system 44. The control system 44 is adapted to receive status information indicative of a current status of the driveline 12 and for at least one, preferably each one, of the electric machines 22, 24, 26 in the set of electric machines with variable regeneration efficiency level:

receive braking torque information indicative of a requested braking torque to be produced by the electric machine 22, 24, 26;

in response to the braking torque information and the status information, determine a target relation between the electric energy and the thermal energy produced by the electric machine 22, 24, 26;

control the electric machine 22, 24, 26 such that the requested braking torque and the determined target relation between electric energy and thermal energy are obtained, and control the cooling system 36 in response to the determined target relation between electric energy and thermal energy for the electric machine.

Purely by way of example, the braking torque information may be received from a sensor (not shown) which may be connected to e.g., a brake pedal or a throttle pedal of a vehicle. Moreover, the braking torque information may be determined by, and maybe also issued from, another control unit (not shown) of the driveline 12.

Herein, to control the electric machine means that the operation of the electric machine is controlled. For instance, controlling an electric machine can mean that the instantaneous torque applied by the machine to the motor axle, i.e., an axle connected to one or more ground engaging members of the driveline 12, is controlled by setting a target torque value to be controlled against. Controlling an electric machine can also mean that the axle speed is controlled by configuring a target axle speed to be maintained by the electric machine.

Herein, to control a cooling system means to control the cooling effect of the system, i.e., the amount of thermal energy transported away from the electric machine per unit of time. To control the cooling system may mean that the flow of cooling liquid through a cooling conduit is controlled, where a large flow is normally associated with an increased cooling effect as compared to a smaller flow. To control a cooling system can also mean that the temperature of the coolant flowing through the cooling conduit is controlled, e.g., by operating valves in connection to a heat exchanger (not shown), by controlling a fan (not shown) arranged in connection to a heat exchanger, or by operating a heat pump (not shown) to extract more energy from the coolant per unit of time.

Furthermore, the feature to determine a target relation between the electric energy and the thermal energy produced by the electric machine 22, 24, 26 in response to the braking torque information and the status information as mentioned hereinabove may comprise determining how much electric energy that can be stored or used by the driveline, e.g., how much electric energy that can be stored in an energy storage system as will be discussed hereinbelow and/or how much electric energy that can be consumed by one or more electric energy consumers. Purely by way of example, an electric consumer may form part of the driveline 12 or may be a component being separate from the driveline 12 but forming part of the vehicle 10 hosting the driveline 12.

Since it may be desired to produce electric energy for storage or consumption purposes instead of producing thermal energy, the control system 44 may be adapted to determine a target relation between the electric energy and the thermal energy produced by the electric machine 22, 24, 26 in which target relation a maximum electric energy production is obtained in view of constraints imposed by storage and/or consumption capacities and in which the remaining energy portion produced by the electric machine 22, 24, 26 is thermal energy.

The above-mentioned status information indicative of a current status of the driveline 12 may relate to one or more of different conditions associated with the driveline or the vehicle hosting the driveline.

Purely by way of example, as indicated in FIG. 2, the driveline 12 may comprise an energy storage system 46 whereby each electric machine 22, 24, 26 in the set of electric machines is connected to at least a portion of the energy storage system such that electric energy can be transferred between the electric machine and the at least a portion of the energy storage system. As such, the energy storage system 46 is preferably adapted to store and supply electric energy.

In the FIG. 2 example, each one of the electric machines 22, 24, 26 is connected to a common entity, preferably a common battery pack, of the energy storage system 46. In fact, in the FIG. 2 embodiment, the energy storage system 46 is constituted by the above-mentioned common entity.

Irrespective of the implementation of the energy storage system 46, the status information indicative of a current status of the driveline may comprise information indicative of a current state of charge of at least a portion of the energy storage system 46 being connected to each electric machine in the set of electric machines. As a non-limiting example, the status information may comprise information indicative of a current state of charge of the common entity constituting the energy storage system 46.

The status information indicative of a current status of the driveline may furthermore comprise information indicative of a power transfer capability of at least a portion of the energy storage system 46 being connected to each electric machine in the set of electric machines. An energy storage device, such as a battery or a super-capacitor is always associated with a maximum power that can be transferred into or out from the device. This capability normally declines with falling temperatures and may also vary for other reasons. The status information therefore advantageously comprises information indicative of the current power capability. This capability may be obtained, e.g., from a pre-determined look-up table indexed by one or more parameters, such as temperature, age of the battery cells, and the like.

Purely by way of example, at least one electric machine in the set of electric machines with variable regeneration efficiency level can be controlled such that the ratio between the electric energy produced and the thermal energy produced by the electric machine during regeneration is less than 0.1, preferably less than 0.05, more preferred less than 0.01. As such, at least one electric machine may be controlled so as to produce a small amount of electric energy which may be useful when e.g., an energy storage system portion connected to the electric machine has a state of charge that is high. The at least one electric machine in the set of electric machines with variable regeneration efficiency level can also be electrically controlled such that is draws power while applying a negative torque or while applying no torque to the motor axle. This feature may be useful when wanting to discharge a battery in preparation, e.g., for a long down-hill drive where a prolonged period of endurance braking is required.

As such, it should be noted that at least certain electric machines may be capable of consuming electric energy during regeneration. In such a condition, the electric energy produced by the electric machine is negative, as a consequence of which the above-mentioned ratio is also negative.

As a non-limiting example, the control system 44 may be adapted to determine cooling capability information of the cooling system 36. For instance, the cooling capability information may be indicative of a current or expected amount of thermal energy that can be removed from the set of electric machines 22, 24, 26 using the cooling system 36. As non-limiting example, the cooling capability information may be determined on the basis of one or more of the following: the temperature ambient of the driveline 12, the speed of the vehicle 10 hosting the driveline and the maximum speed at which a coolant can flow through the cooling conduit 42. Moreover, the control system 44 may be adapted to control the set of electric machines 22, 24, 26 in response to the cooling capability information. According to another non-limiting example, the cooling capability of the cooling system 36 can be measured during operation of the vehicle, and the cooling capability information of the cooling system 36 may then be determined based on the previously measured data. This way the information can be tailored to a specific vehicle and thus adapted over time to be more accurate.

The variable regeneration efficiency level for an electric machine can be obtained in a plurality of different ways and a non-exhaustive list of examples are presented hereinbelow.

Figure 3:
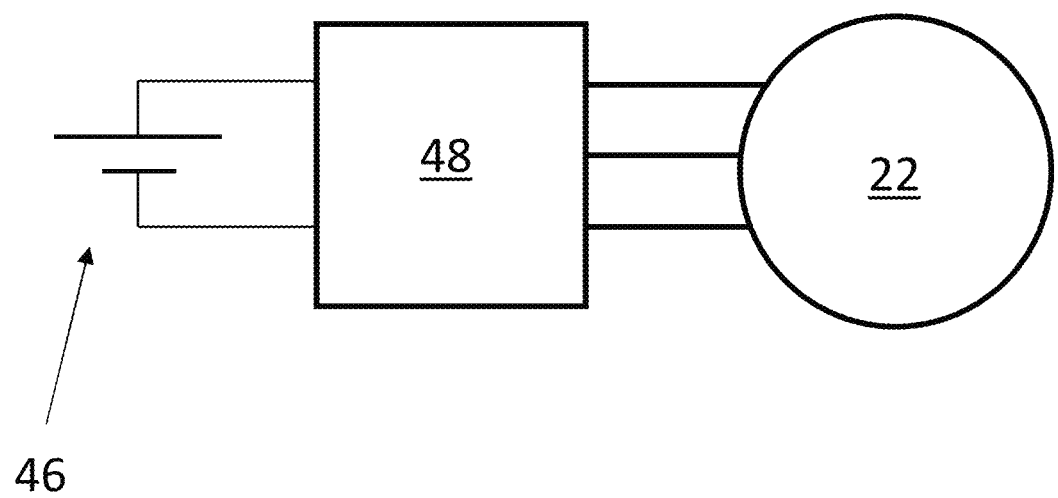
FIG. 3 schematically illustrates an assembly comprising an energy storage system, an inverter and an electric machine.

As a first non-limiting example, with reference to FIG. 3, at least one electric machine, the first electric machine 22 in the FIG. 2 embodiment is used an example in FIG. 3, in the set of electric machines with variable regeneration efficiency level is an AC electric machine connected to an inverter 48. Furthermore, the inverter 48 is connected to an energy storage system 46 which in FIG. 3 is schematically illustrated as a battery.

In the implementation illustrated in FIG. 3, the electric machine 22 is a three phase electric machine, as a consequence of which the inverter 48 is adapted to convert DC electric power from the energy storage system 46 to three phase AC electric power and vice versa. Generally, the inverter 48 comprises a set of switches (not shown) that can open or close in accordance with control signals, for instance using pulse width modulation, such that the three phase AC electric power fed to the electric machine 22 can be varied. Put differently, the inverter can issue a current vector to the electric machine 22. Although the FIG. 3 example illustrates a three phase AC electric machine 22, it should be noted that the inverter 48 and the electric machine 22 may be adapted for another number of phases.

Irrespective of the implementation of the inverter 48 and the electric machine 22, the inverter 48 may be adapted to issue a current vector to the electric machine. As such, the relation between electric energy and thermal energy produced by the electric machine 22 during regeneration can be controlled by controlling the current vector issued from the inverter 48.

The principle of controlling efficiency of an electric machine by control of the current vector has been previously studied in, e.g., GB2477229B and US 2017/0282751A1, and will therefore not be discussed in more detail herein.

Instead of, or in addition to, controlling the regeneration efficiency level of an electric machine by means of the current vector issued from an inverter, the regeneration efficiency level may be controlled by modifying elements of the electric machine as such.

Purely by way of example, at least one electric machine in the set of electric machines with variable regeneration efficiency level may be an AC electric machine comprising a rotor and a stator with an airgap therebetween, whereby the stator comprises a stator body and a stator element. Moreover, it should again be noted that the third aspect of the present invention relates to an AC electric machine as such.

Figure 4:
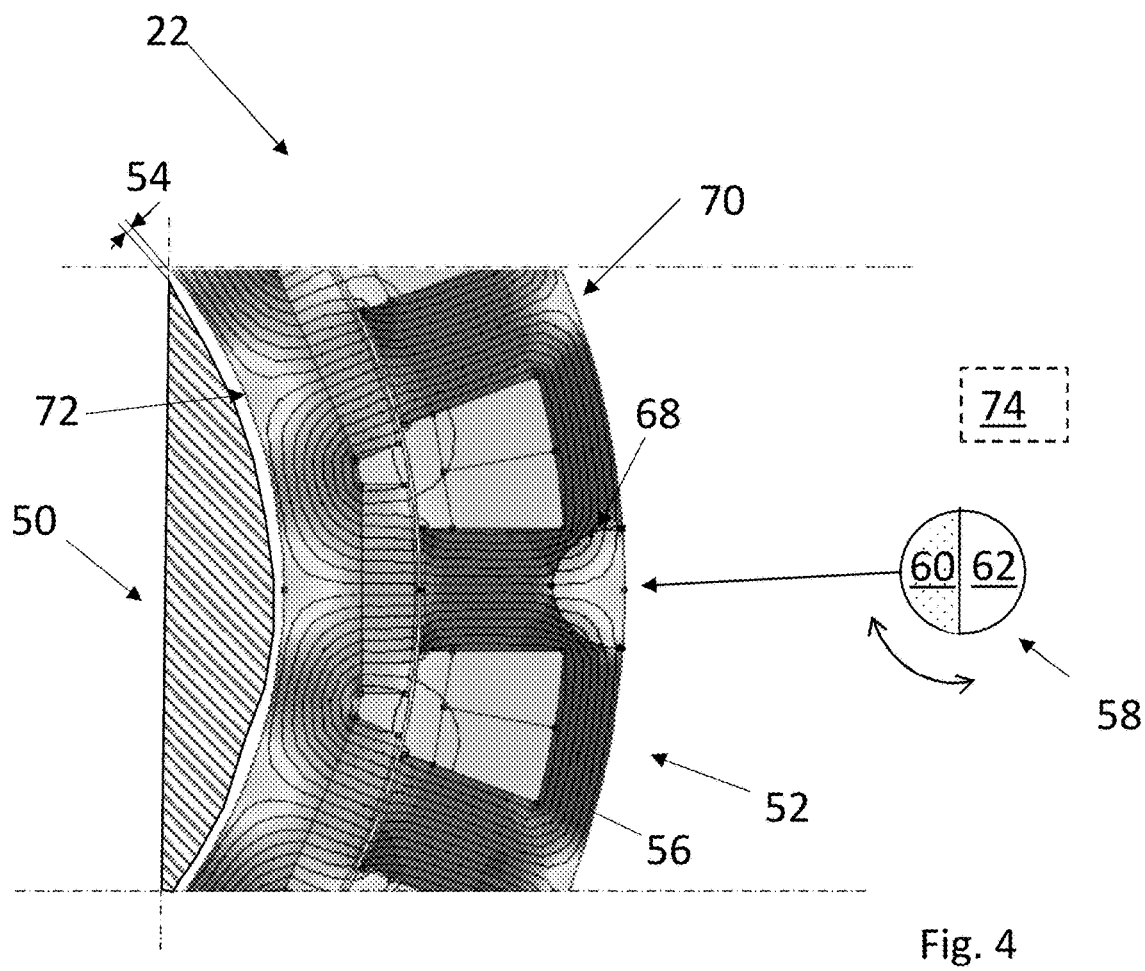
FIG. 4 schematically illustrates an implementation of an electric machine.

To this end, reference is made to FIG. 4 illustrating a portion of an electric machine 22. The FIG. 4 electric machine may form part of the above-mentioned set of electric machines with variable regeneration efficiency level. As may be gleaned from FIG. 4, the electric machine 22 illustrated therein is an AC electric motor with a rotor 50 and a stator 52. Purely by way of example, the rotor may comprise one or more permanent magnets (not shown) such that the FIG. 4 electric machine is a synchronous motor. However, it is also contemplated that embodiments of the electric machine may comprise a stator with one or more electromagnets (not shown). Moreover, it is envisaged that implementations of the electric machine may be an asynchronous motor, e.g., an induction motor in which the rotor comprises a rotor winding (not shown) in which a current is induced by the magnetic field produced by the stator.

Irrespective of the implementation of the electric machine 22, an airgap 54 is formed between the rotor 50 and the stator 52. Moreover, as indicated in FIG. 4, the stator 52 comprises a stator body 56 and a stator element 58. The relation between electric energy and thermal energy produced by the electric machine 22 during regeneration is dependent on the position of the stator element 58 relative to the stator body 56.

Figure 5:
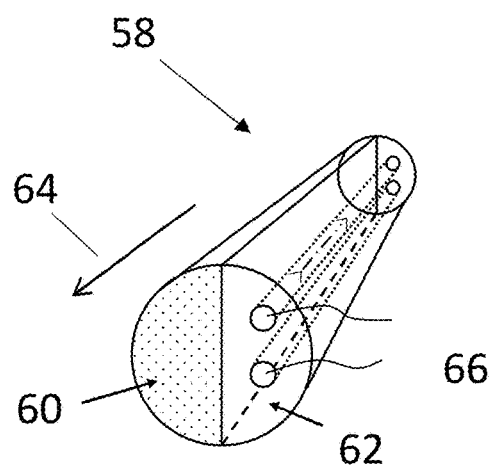
FIG. 5 schematically illustrates implementation of a portion of an electric machine.

Purely by way of example, as indicated in FIG. 5, the stator element 58 may be an elongate member 58 that in turn comprises a first elongate portion 60 and a second elongate portion 62. The first elongate portion 60 is of a first material and the second elongate portion 62 of a second material that is different from the first material. The first and second elongate portions 60, 62 are attached to each other and extend in parallel to each other along a stator element axis 64.

As a non-limiting example, the first material has a first magnetic permeability and the second material has a second magnetic permeability, the first magnetic permeability being greater than the second magnetic permeability.

As a non-limiting example, the first material can for instance be a material with high magnetic permeability such as soft magnetic composite or laminated magnetic steel.

Moreover, as another non-limiting example, where the second material may be low magnetic permeability material such as copper or aluminium. Generally, the second material can be any proper electric conductor material.

Magnetic permeability is a measure of magnetization that a material obtains in response to an applied magnetic field. Permeability is typically represented by the Greek letter μ. The reciprocal of magnetic permeability is magnetic reluctivity. In SI units, permeability is measured in Henries per meter (H/m), or equivalently in Newtons per ampere squared (N/A2). The permeability constant μ0, also known as the magnetic constant or the permeability of free space, is the proportionality between magnetic induction and magnetizing force when forming a magnetic field in a classical vacuum. A closely related property of materials is magnetic susceptibility, which is a dimensionless proportionality factor that indicates the degree of magnetization of a material in response to an applied magnetic field.

Further, as indicated in FIG. 5, the stator element 58 may comprise one or more cooling channels 66 being in fluid communication with the cooling system (not shown in FIG. 4). Preferably, and as exemplified in FIG. 5, the second elongate portion 62 may comprise one or more cooling channels 66 being in fluid communication with the cooling system.

The FIG. 5 implementation of the stator element 58 is cylindrical with a circular cross-section in a plane perpendicular to the stator element axis 64. Moreover, each one of the first and second elongate portions 60, 62 has a cross-sectional shape in the form of a semi-circle in a plane perpendicular to the stator element axis 64. However, it is envisaged that implementations of the stator element 58 may have other cross-sectional shapes of the stator element 58 as such or at least one of the first and second elongate portions 60, 62.

Moreover, as indicated in FIG. 4, the stator body 56 may comprise a stator body cavity 68 for accommodating at least a portion of the stator element 58. Furthermore, as indicated by the arrows in FIG. 4, the stator element 58 can be rotated around the stator element axis 64 relative to the stator body 56 when the stator element is at least partially accommodated in the stator body cavity 68.

Owing to the fact that the first elongate portion 60 is of a first material and the second elongate portion 62 of a second material that is different from the first material, different rotational positions of the stator element 58 relative to the stator body 56 will result in different characteristics of the magnetic flux in the above-mentioned airgap 54. The different characteristics of the magnetic flux in turn implies different relations between electric energy and thermal energy produced the electric machine during regeneration. As such, a desired regeneration efficiency level of the electric machine may be obtained by placing the stator element 58 in a certain position relative to the stator body 56. To this end, the electric motor 22 may comprise an actuator 74 adapted to move, e.g., rotate, the stator element 58 relative to the stator body 56 such that a desired position of the stator element 58 relative to the stator body 56 can be obtained. Purely by way of example, the rotor 50 is adapted to rotate around a rotor axis of rotation and the stator element 58 may be adapted to rotate around a stator element axis of rotation that is parallel to the rotor axis of rotation.

As indicated in FIG. 4, the stator body has an outer circumference 70 and an inner circumference 72 wherein the inner circumference 72 faces the rotor 50. As such, the air gap 54 is formed between the rotor 50 and the inner circumference 72. Preferably, and as indicated in FIG. 4, the stator body cavity 68 is arranged in the outer circumference 70.

Although FIG. 4 and FIG. 5 illustrate an implementation of an electric machine in which the stator element 58 can be rotated around the stator element axis 64 relative to the stator body 56 it is also contemplated that the stator element 58 may be moved relative to the stator body 56 in other ways in order control the relation between electric energy and thermal energy produced by the electric machine 22 during regeneration.

Figure 6:
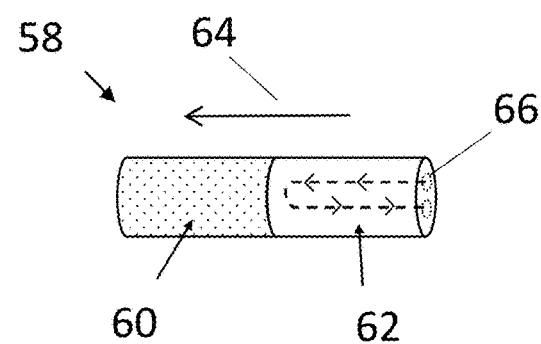
FIG. 6 schematically illustrates implementation of a portion of an electric machine.

To this end, reference is made to FIG. 6 illustrating an implementation of the stator element 58 which is instead divided transversally to its stator element axis 64 such that the first elongate portion 60 forms one end of the stator element and the second and a second elongate portion 62 forms the opposite end of the stator element. With this configuration, the axial position of the stator element 58 relative to the stator will affect the magnetic properties of the stator 52, and thus impact the relation between electric energy and thermal energy produced by the electric machine 22 during regeneration.

In other words, the stator element 58 may be adapted to slide back and forth in the axial direction, viz along the stator element axis 64, in order to change the magnetic properties of the stator 52. As for the FIG. 4 implementation, the movement back and forth along of the stator element 58 relative to the stator body 56 along the stator element axis 64 may be carried out by an actuator 74, such as a linear actuator, connected to the stator element 58. Moreover, as in the FIG. 5 implementation of the stator element 58, the FIG. 6 implementation of the stator element 58 may also comprise a cooling channel 66. Here, it should be noted that the FIG. 6 stator element 58 comprises a cooling channel 66 that forms a closed circuit in the second elongate portion 62.

Although the implementations presented hereinabove with references to FIG. 4-FIG. 6 only have introduced one stator element 58, it is of course contemplated that implementations of the electric machine 22 may comprise a plurality of stator elements 58, each one of which being moveable relative to the stator body 56. As a non-limiting example, each such stator element 58 may be individually moveable relative of the stator body 56. As another non-limiting example, the stator elements 58 may be jointly moveable relative to the stator body 56.

Figure 7:
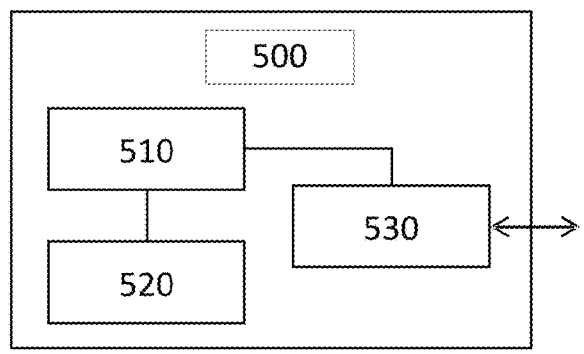
FIG. 7 schematically illustrates a control unit.

FIG. 7 schematically illustrates, in terms of a number of functional units, the components of a control unit which may support at least some of the above discussed methods and techniques for controlling cooling systems and drivelines. Processing circuitry 510 is provided using any combination of one or more of a suitable central processing unit CPU, multiprocessor, microcontroller, digital signal processor DSP, etc., capable of executing software instructions stored in a computer program product, e.g., in the form of a storage medium 520. The processing circuitry 510 may further be provided as at least one application specific integrated circuit ASIC, or field programmable gate array FPGA.

Particularly, the processing circuitry 510 is configured to cause the control unit 500 to perform a set of operations, or steps, such as the methods discussed herein.

For example, the storage medium 520 may store the set of operations, and the processing circuitry 510 may be configured to retrieve the set of operations from the storage medium 520 to cause the control unit 101 to perform the set of operations. The set of operations may be provided as a set of executable instructions. Thus, the processing circuitry 510 is thereby arranged to execute methods as herein disclosed.

The storage medium 520 may also comprise persistent storage, which, for example, can be any single one or combination of magnetic memory, optical memory, solid state memory or even remotely mounted memory.

The control unit 101 may further comprise an interface 530 for communications with at least one external device. As such the interface 530 may comprise one or more transmitters and receivers, comprising analogue and digital components and a suitable number of ports for wireline or wireless communication.

The processing circuitry 510 controls the general operation of the control unit 101, e.g., by sending data and control signals to the interface 530 and the storage medium 520, by receiving data and reports from the interface 530, and by retrieving data and instructions from the storage medium 520. Other components, as well as the related functionality, of the control node are omitted in order not to obscure the concepts presented herein.

Figure 8:
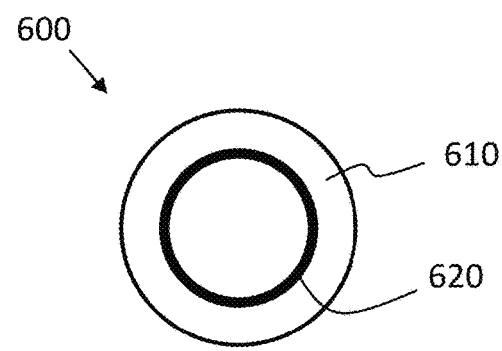
FIG. 8 shows an example computer program product.

FIG. 8 illustrates a computer readable medium 610 carrying a computer program comprising program code means 620 for performing the methods discussed herein, when said program product is run on a computer. The computer readable medium and the code means may together form a computer program product 600.

Figure 9:
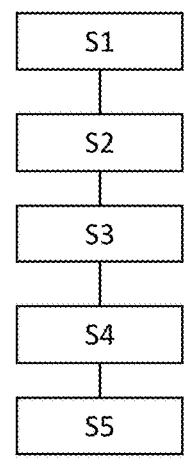
FIG. 9 is a flow chart illustrating a method.

Finally, FIG. 9 illustrates a flowchart for computer-implemented method performed in a control unit 500, such as the FIG. 7 control unit 500, arranged to control a driveline 12 for a vehicle 10. The driveline 12 comprises a set of electric machines 22, 24, 26 with variable regeneration efficiency level. The set of electric machines 22, 24, 26 with variable regeneration efficiency level comprises at least one electric machine 22, 24, 26 with variable regeneration efficiency level. An electric machine 22, 24, 26 with variable regeneration efficiency level is such that the relation between electric energy and thermal energy produced by the electric machine 22, 24, 26 during regeneration can be varied. The driveline 12 further comprises a cooling system 36 connected to each electric machine 22, 24, 26 in the set of electric machines 22, 24, 26 such that the cooling system 36 can remove heat generated by each electric machine 22, 24, 26 in the set of electric machines 22, 24, 26.

The method comprises:
- receiving S1 status information indicative of a current status of the driveline 12 and for at least one, preferably each one, of the electric machine in the set of electric machines 22, 24, 26 with variable regeneration efficiency level;
- receiving S2 braking torque information indicative of a requested braking torque to be produced by the electric machine 22, 24, 26;
- in response to the braking torque information and the status information, determining S3 a target relation between the electric energy and the thermal energy produced by the electric machine 22, 24, 26;
- controlling S4 the electric machine 22, 24, 26 such that the requested braking torque and the determined target relation between electric energy and thermal energy are obtained, and
- controlling S5 the cooling system 36 in response to the determined target relation between electric energy and thermal energy for the electric machine 22, 24, 26.

It is to be understood that the present invention is not limited to the embodiments described above and illustrated in the drawings; rather, the skilled person will recognize that many changes and modifications may be made within the scope of the appended claims.

The invention claimed is:

1. A driveline for a vehicle, said driveline comprising a set of electric machines with variable regeneration efficiency level, said set of electric machines with variable regeneration efficiency level comprising at least one electric machine with variable regeneration efficiency level, wherein an electric machine with variable regeneration efficiency level is such that the relation between electric energy and thermal energy produced by the electric machine during regeneration can be varied, said driveline further comprising a cooling system connected to each electric machine in said set of electric machines such that the cooling system can remove heat generated by each electric machine in said set of electric machines, said driveline further comprising a control system, said control system being adapted to receive status information indicative of a current status of said driveline and for at least one of said electric machine in said set of electric machines with variable regeneration efficiency level:
- receive braking torque information indicative of a requested braking torque to be produced by said electric machine;
- in response to said braking torque information and said status information, determine a target relation between said electric energy and said thermal energy produced by said electric machine;

control said electric machine such that the requested braking torque and the determined target relation between electric energy and thermal energy are obtained, and
control said cooling system in response to said determined target relation between electric energy and thermal energy for said electric machine;
wherein at least one electric machine in said set of electric machines with variable regeneration efficiency level is an AC electric machine comprising a rotor and a stator with an airgap therebetween, whereby said stator comprises a stator body and a stator element, whereby the relation between electric energy and thermal energy produced by the electric machine during regeneration is dependent on the position of said stator element relative to said stator body, and wherein said stator element is an elongate member that in turn comprises a first elongate portion and a second elongate portion, said first elongate portion being of a first material and said second elongate portion being of a second material that is different from said first material, said first and second elongate portions being attached to each other and extending in parallel to each other along a stator element axis.

2. The driveline according to claim 1, wherein said set of electric machines with variable regeneration efficiency level comprises at least two electric machines.

3. The driveline according to claim 1, wherein said driveline further comprises an energy storage system whereby each electric machine in said set of electric machines is connected to at least a portion of said energy storage system such that electric energy can be transferred between said electric machine and said at least a portion of said energy storage system, said status information indicative of a current status of said driveline comprising information indicative of a current state of charge of at least a portion of said energy storage system being connected to each electric machine in said set of electric machines.

4. The driveline according to claim 3, wherein each electric machine in said set of electric machines is connected to a common battery pack, of said energy storage system.

5. The driveline according to claim 1, wherein said cooling system comprises a set of cooling conduits wherein at least one cooling conduit extends to each electric machine in said set of electric machines, said cooling system being adapted to control a flow and/or a temperature of coolant through said cooling conduits.

6. The driveline according to claim 5, wherein said cooling system is adapted to control the distribution of the flow of coolant amongst said cooling conduits.

7. The driveline according to claim 1, wherein at least one electric machine in said set of electric machines with variable regeneration efficiency level can be controlled such that the ratio between the electric energy produced and the thermal energy produced by the electric machine during regeneration is less than 0.1.

8. The driveline according to claim 1, wherein at least one electric machine in said set of electric machines with variable regeneration efficiency level is an AC electric machine connected to an inverter, said inverter being adapted to issue a current vector to said electric machine, whereby the relation between electric energy and thermal energy produced by the electric machine during regeneration can be controlled by controlling said current vector issued from said inverter.

9. The driveline according to claim 1, wherein said first material has a first magnetic permeability and said second material has a second magnetic permeability, said first magnetic permeability being greater than said second magnetic permeability.

10. The driveline according to claim 1, wherein said stator element comprises one or more cooling channels being in fluid communication with said cooling system, wherein said second elongate portion comprises one or more cooling channels being in fluid communication with said cooling system.

11. The driveline according to claim 1, wherein said stator body comprises a stator body cavity for accommodating at least a portion of said stator element, wherein said stator element can be rotated around said stator element axis relative to said stator body when said stator element is at least partially accommodated in said stator body cavity, whereby the relation between electric energy and thermal energy produced by the electric machine during regeneration is dependent on the rotational position of said stator element relative to said stator body.

12. The driveline according to claim 11, wherein said stator body has an outer circumference and an inner circumference, wherein said inner circumference faces said rotor, said stator body cavity being arranged in said outer circumference.

13. The driveline according to claim 1, wherein the control system is adapted to determine cooling capability information of said cooling system, said cooling capability information being indicative of a current or expected amount of thermal energy that can be removed from said set of electric machines using said cooling system, said control system being adapted to control the set of electric machines in response to said cooling capability information.

14. The driveline according to claim 1, further comprising one or more ground engaging members, at least one ground engaging member being adapted to be connected to an electric machine of said set of electric machines such that rotational energy may be transferred between said ground engaging member and said electric machine.

15. The driveline according to claim 14, wherein each one of at least two ground engaging members is adapted to be connected to different electric machines of said set of electric machines such that rotational energy may be transferred between said ground engaging member and said electric machine.

16. A vehicle comprising a driveline according to claim 1, wherein said vehicle is a heavy-duty vehicle.

17. A computer-implemented method performed in a control unit arranged to control a driveline for a vehicle, said driveline comprising a set of electric machines with variable regeneration efficiency level, said set of electric machines with variable regeneration efficiency level comprising at least one electric machine with variable regeneration efficiency level, wherein an electric machine with variable regeneration efficiency level is such that the relation between electric energy and thermal energy produced by the electric machine during regeneration can be varied, said driveline further comprising a cooling system connected to each electric machine in said set of electric machines such that the cooling system can remove heat generated by each electric machine in said set of electric machines, the method comprising
receiving status information indicative of a current status of said driveline and for at least one, of said electric machine in said set of electric machines with variable regeneration efficiency level;

receiving braking torque information indicative of a requested braking torque to be produced by said electric machine;

in response to said braking torque information and said status information, determining a target relation between said electric energy and said thermal energy produced by said electric machine;

controlling said electric machine such that the requested braking torque and the determined target relation between electric energy and thermal energy are obtained, and controlling said cooling system in response to said determined target relation between electric energy and thermal energy for said electric machine;

wherein at least one electric machine in said set of electric machines with variable regeneration efficiency level is an AC electric machine comprising a rotor and a stator with an airgap therebetween, whereby said stator comprises a stator body and a stator element, whereby the relation between electric energy and thermal energy produced by the electric machine during regeneration is dependent on the position of said stator element relative to said stator body, and wherein said stator element is an elongate member that in turn comprises a first elongate portion and a second elongate portion, said first elongate portion being of a first material and said second elongate portion being of a second material that is different from said first material, said first and second elongate portions being attached to each other and extending in parallel to each other along a stator element axis.

18. A computer program comprising program code means for performing the steps of claim 17 when said program is run on a computer or on processing circuitry of a control unit.

* * * * *